United States Patent [19]

Imai

[11] 4,235,521
[45] Nov. 25, 1980

[54] PHOTOGRAPHIC LENS SYSTEM

[75] Inventor: Toshihiro Imai, Hachiouji, Japan

[73] Assignee: Olympus Optical Co., Ltd., Tokyo, Japan

[21] Appl. No.: 963,364

[22] Filed: Nov. 24, 1978

[30] Foreign Application Priority Data

Nov. 29, 1977 [JP] Japan ................. 52-142167

[51] Int. Cl.³ .................. G02B 9/60
[52] U.S. Cl. .................. 350/216
[58] Field of Search ............ 350/216, 176

[56] References Cited

U.S. PATENT DOCUMENTS 3,868,174  2/1975  Yakota ................. 350/216

FOREIGN PATENT DOCUMENTS 44-24069 10/1969 Japan ................. 350/216

*Primary Examiner*—Paul A. Sacher
*Attorney, Agent, or Firm*—Cushman, Darby & Cushman

[57] ABSTRACT

A photographic lens system for use in a compact camera, having an angular field of view of 60° to 70° and aperture ratio of F/2.8 and comprising a first lens component of a positive meniscus lens with its convex surface on the object side, a second lens component of a biconcave lens, a third lens component of a single or cemented positive lens, a fourth lens component of a negative meniscus lens with its convex surface on the image side and a fifth lens component of a positive meniscus lens with its convex surface on the image side.

6 Claims, 8 Drawing Figures

SPHERICAL ABERRATION 
ASTIGMATISM 
DISTORTION

SPHERICAL ABERRATION 
ASTIGMATISM 
DISTORTION

PHOTOGRAPHIC LENS SYSTEM

FIELD OF THE INVENTION

The present invention relates to a photographic lens system, for use in a compact camera having a range finder and using a 35 mm film, and more particularly to a lens system having an angular field of view of 60° to 70° and a relative aperture of F/2.8, a length from the first lens surface to the film surface being almost as short as the overall focal length.

DESCRIPTION OF THE PRIOR ART

Conventionally, for the purpose of making compact a lens system such as described above, a Tessar type lens system with a rear aperture stop has been adopted. However, in a lens system of Tessar type with a rear aperture stop (as described, for example, in Japanese Published Examined Patent Application No. 19387/72), the length from the first lens surface to the film surface had to be limited to a length in the order of 42 mm for use in a 35 mm film.

The present invention provides a very compact photographic lens system, in which the length from the first lens surface to the film surface is 35 mm or less.

In order to shorten the total length of the lens system, there have been known two methods, one is to shorten the focal length of the lens system and the other is to make the telephoto ratio small (a proportion between the length from the first lens surface and the film surface to the focal length). In order to make the total length of the lens system markedly short as described above, it is necessary both to shorten the focal length and to make the telephoto ratio small. In order to make the telephoto ratio small, there may be adopted a telephoto type lens system in which a negative lens is arranged at a rear portion of the lens system. However, in order to shorten the focal length in such a telephoto type lens system, it is necessary to secure good lens characteristics over an angular field of view of wider than 60°, which was inconceivable in a conventional telephoto type lens system.

SUMMARY OF THE INVENTION

According to the present invention, on the one hand, a telephoto type lens system is adopted in order to make the telephoto ratio small and, on the other hand, the focal length in the lens system is made as short as possible but the image quality is kept good over a wide angular field of view, which by having them well balanced, enables provision of a very compact photographic lens system having superior characteristics.

The photographic lens system according to the present invention comprises a first lens component of a positive meniscus lens with its convex surface on the object side, a second lens component of a biconcave lens, a third lens component having a positive refracting power, a fourth lens component of a negative meniscus lens with its convex surface on the image side and a fifth lens component of a positive meniscus lens with its convex surface on the image side, the said lens system satisfying the following conditions:

(1) $1.2 < f/f_{123} < 1.8$ (2) $-1.3 < f/f_{45} < -0.35$ (3) $0.1 < D_5/f < 0.17$ (4) $0.13 < d_6/f$ wherein the reference symbol $f_{123}$ represents the composite focal length of the first, second and third lens components of the front lens group located in front of the aperture stop, the symbol $f_{45}$ represents the composite focal length of the fourth and fifth lens components of the rear lens group located behind the aperture stop, the symbol $D_5$ represents the axial thickness of the third lens component (in the case of a cemented lens, $D_5$ represents the axial thickness of both the lenses), the symbol $d_6$ represents the axial air space between the third and fourth lens components, that is, between the front and rear lens groups, and the symbol $f$ represents the overall focal length of the total lens system, respectively.

Further objects and advantages will be apparent in the arrangements as set forth in the following specification taken together with the accompanying drawings.

DESCRIPTION OF THE PREFERRED EMBODIMENTS

Figure 1:
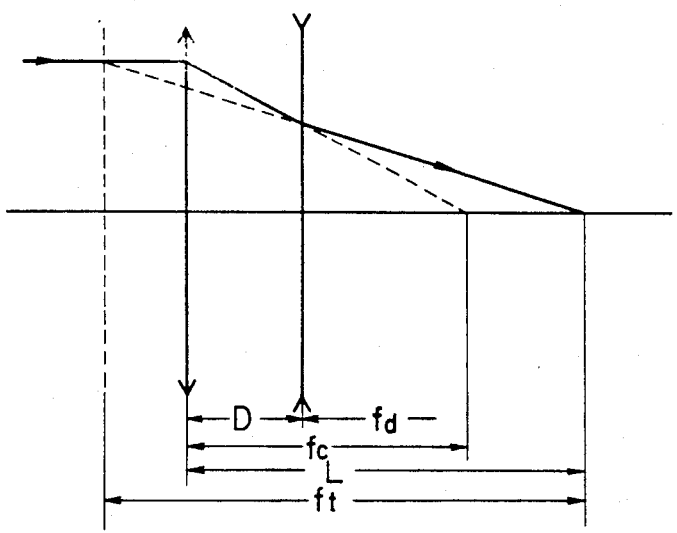
FIG. 1 shows the principle of the present invention.

In the phtographic lens system according to the present invention, a telephoto type lens system is adopted with a front lens group being of convergent lens type and a rear lens group being of dispersive lens type. As shown in FIG. 1, when a composite focal length of the front lens group is represented by $f_c$, a composite focal length of the rear lens group by $f_d$, a focal length of the total lens system by $f_t$, an interval of principal points between the front and rear lens groups by $D$, the length from the principal point of the rear lens group to the film surface by $X_B$ and the length from the principal point of the front lens group to the film surface by $L$, the telephoto ratio $R$ in the paraxial optical system can be obtained as follows:

$$L = D + X_B$$
$$\frac{1}{f_d} = -\frac{1}{f_c - D} + \frac{1}{X_B}$$

thus, $$\frac{1}{X_B} = \frac{1}{f_c - D} + \frac{1}{f_d} = \frac{f_d + f_c - D}{f_d(f_c - D)}$$
$$\frac{1}{f_t} = \frac{1}{f_c} + \frac{1}{f_d} - \frac{D}{f_c \cdot f_d}$$

therefore, $$R = \frac{L}{f_t} = \frac{D + X_B}{f_t} \quad \text{(a)}$$
$$= \left\{ \frac{1}{f_c} + \frac{1}{f_d} - \frac{D}{f_c \cdot f_d} \right\} \left\{ D + \frac{f_d(f_c - D)}{f_d + f_c - D} \right\}$$
$$= \left( \frac{f_d + f_c - D}{f_c \cdot f_d} \right) D - \frac{D}{f_c} + 1$$
$$= \frac{D}{f_d}\left(1 - \frac{D}{f_c}\right) + 1$$

-continued $$\frac{1}{f_t} = \frac{f_d + f_c - D}{f_c \cdot f_d}$$

therefore, $$R = (\frac{f_d + f_c - D}{f_c \cdot f_d})D - \frac{D}{f_c} + 1 \qquad (b)$$
$$= \frac{D}{f_t} - \frac{D}{f_c}) + 1$$
$$= \frac{D}{f_t}(1 - \frac{f_t}{f_c}) + 1$$

The Petzval's sum is a parameter which can show a curvature of field and it has been known as can be represented by the following expression (c).

$$P = \sum_i \frac{1}{n_i f_i} \qquad (c)$$

In the expression (b) among these expressions (a), (b) and (c), $(1-f_t/f_b)$ is a negative value in the telephoto type lens system so that it is necessary to make $f_t/f_c$ large in order to make the telephoto ratio small. According to the present invention, as shown in condition (1), the telephoto ratio is intended to be made small by making $f_t/f_c$ (that is, $f/f_{123}$) larger than 1.2, and when $f/f_{123}$ is smaller than 1.2, it is impossible to make the telephoto ratio R small.

In the expression (a), the total value of $D/f_d(1-D/f_c)$ is in the negative because $f_d$ is in the negative value so that $|1/f_d|$ may be made large in order to make the telephoto ratio R small. Thus, according to the present invention, the telephoto ratio R is intended to be made small by making $f/f_{45}$ smaller than $-0.35$. That is, it becomes impossible to make the telephoto ration small if $f/f_{45}$ is larger than $-0.35$.

As seen from the expression (b), the telephoto ratio R becomes small if D is made larger so that, according to the present invention, $d_6/f$ is made larger than 0.13, and $d_6$ which corresponds to D is made large. Therefore, when $d_6/f$ is outside of the condition (4), the telephoto ratio becomes large.

Next, in order to secure good lens characteristics over an angular field of view of wider than 60° in the telephoto type lens system, it is necessary that a curvature of field and an astigmatic difference be of small values. For the purpose of achieving a good condition of the curvature of field, it is necessary to make the focal length of the front convergent lens group as long as possible. Therefore, as shown in the condition (1), it is necessary that $f/f_{123}$ be smaller than 1.8. If the upper limit under this condition (1) is exceeded, the curvature of field becomes large. In order to make the curvature of field even smaller, it is desirable that each of the refractive indices $n_1$, $n_3$ and $n_5$ [$\frac{1}{2}(n_3+n'_3)$, in the case where the third lens component is a cemented lens and respective refractive indides are $n_3$ and $n'_3$] of the first, third and fifth lens components which are positive lenses in the lens system is larger than 1.7. According to the present invention, $D_5/f$ is made larger than 0.1 in thickness in order to make the astigmatic difference small over whole angular field of view and when $D_5/f$ becomes smaller than 0.1, the astigmatic difference becomes large. Hoever, when $D_5/f$ becomes larger than 0.17 because of $D_5$ being too thick, the total length of the lens system becomes long and a sufficient marginal quantity of light cannot be obtained. Therefore, as shown in the condition (3), it is necessary that $D_5/f$ be smaller than 0.17.

Next, in order to keep an oblique beam of light symmetrical, the fourth lens component in the rear dispersive lens group is formed in a tightly curved meniscus shape. However, in order to make the telephoto ratio small as explained above, $f/f_{45}$ is made smaller than $-0.35$ and, as the power of the rear lens group is increased, the absolute value of the radius of curvature of the surface of the fourth lens component at the object side becomes small and the bulging (on graphical showing) of the axial spherical aberration becomes large with a consequence of a marked deterioration of the lens characteristics on the axis. Therefore, in order to prevent the deterioration of the lens characteristics on the axis, it is desirable that $f/f_{45}$ be kept larger than $-1.3$ while $|r_7|/f$ is made larger than 0.15. When $f/f_{45}$ becomes smaller than $-1.3$, the lens characteristics on the axis deteriorate.

In the photographic lens system according to the present invention, a high power dispersive lens group is adopted as the rear lens group having a large angular field of view of wider than 60° and, thus, when an angular field of view becomes large, there occurs a great distortion of the positive value. According to the present invention, for the purpose of preventing the occurence of the distortion, the rear lens group consists of a negative meniscus lens and a positive meniscus lens, and it is so designed that the distortion is made small by this positive meniscus lens. If $d_6$ is made large in order to make the telephoto ratio small, the diameter of the positive meniscus lens becomes very large and its thickness unavoidably becomes thick. It is desirable that $d_6/f$ be smaller than 0.25 in this point.

Now, some preferred embodiments of the present invention relating to the photographic lens system as described above are given below:

| Embodiment 1 | | | |
|---|---|---|---|
| $r_1 = 28.264$ | | | |
| | $d_1 = 7.35$ | $n_1 = 1.788$ | $v_1 = 47.43$ |
| $r_2 = 57.161$ | | | |
| | $d_2 = 3.09$ | | |
| $r_3 = -277.429$ | | | |
| | $d_3 = 2.94$ | $n_2 = 1.78472$ | $v_2 = 25.71$ |
| $r_4 = 54.228$ | | | |
| | $d_4 = 4.47$ | | |
| $r_5 = 45.437$ | | | |
| | $d_5 = 3.39$ | $n_3 = 1.80440$ | $v_3 = 39.62$ |
| $r_5' = 27.309$ | | | |
| | $d_5' = 10.80$ | $n_3' = 1.72$ | $v_3' = 46.03$ |
| $r_6 = -185.983$ | | | |
| | $d_6 = 16.56$ | | |
| $r_7 = -18.491$ | | | |
| | $d_7 = 2.94$ | $n_4 = 1.804$ | $v_4 = 46.57$ |
| $r_8 = -32.533$ | | | |
| | $d_8 = 2.98$ | | |
| $r_9 = -188.491$ | | | |
| | $d_9 = 5$ | $n_5 = 1.7495$ | $v_5 = 35.27$ |
| $r_{10} = -84.671$ | | | |
| | $\Sigma_d = 59.52$ | | |
| | $f = 100$ | $f_B = 38.85$ | F 2.8 |
| | $f_{123} = 62.1$ | $f/f_{123} = 1.61$ | |
| | $f_{45} = -90.9$ | $f/f_{45} = -1.1$ | |

| Embodiment 2 | | | |
|---|---|---|---|
| $r_1 = 29.984$ | | | |
| | $d_1 = 8.62$ | $n_1 = 1.7725$ | $v_1 = 49.6$ |
| $r_2 = 91.570$ | | | |
| | $d_2 = 2.24$ | | |

-continued

Embodiment 2

| | | | |
|---|---|---|---|
| $r_3 = -363.920$ | | | |
| | $d_3 = 3.08$ | $n_2 = 1.69895$ | $\nu_2 = 30.12$ |
| $r_4 = 38.182$ | | | |
| | $d_4 = 4.92$ | | |
| $r_5 = 89.488$ | | | |
| | $d_5 = 11.18$ | $n_3 = 1.741$ | $\nu_3 = 52.68$ |
| $r_6 = -112.502$ | | | |
| | $d_6 = 17.21$ | | |
| $r_7 = -22.028$ | | | |
| | $d_7 = 4.98$ | $n_4 = 1.6398$ | $\nu_4 = 34.48$ |
| $r_8 = 31.264$ | | | |
| | $d_8 = 0.32$ | | |
| $r_9 = -129.517$ | | | |
| | $d_9 = 7.10$ | $n_5 = 1.7432$ | $\nu_5 = 49.41$ |
| $r_{10} = -97.491$ | | | |
| $\Sigma d = 59.65$ | | | |
| $f = 100$ | $f_B = 47.98$ | F 2.8 | |
| $f_{123} = 74.1$ | $f/f_{123} = 1.35$ | | |
| $f_{45} = -232$ | $f/f_{45} = -0.431$ | | |

Embodiment 3

| | | | |
|---|---|---|---|
| $r_1 = 32.686$ | | | |
| | $d_1 = 8.44$ | $n_1 = 1.788$ | $\nu_1 = 47.43$ |
| $r_2 = 85.756$ | | | |
| | $d_2 = 2.19$ | | |
| $r_3 = -236.675$ | | | |
| | $d_3 = 3.13$ | $n_2 = 1.71736$ | $\nu_2 = 29.51$ |
| $r_4 = 46.799$ | | | |
| | $d_4 = 5.88$ | | |
| $r_5 = 77.718$ | | | |
| | $d_5 = 7.56$ | $n_3 = 1.7859$ | $\nu_3 = 44.18$ |
| $r_5' = -56.705$ | | | |
| | $d_5' = 3.75$ | $n_3' = 1.68893$ | $\nu_3' = 31.08$ |
| $r_6 = -180.584$ | | | |
| | $d_6 = 22.91$ | | |
| $r_7 = -21.841$ | | | |
| | $d_7 = 2.28$ | $n_4 = 1.697$ | $\nu_4 = 48.51$ |
| $r_8 = -29.745$ | | | |
| | $d_8 = 0.31$ | | |
| $r_9 = -115.761$ | | | |
| | $d_9 = 5.25$ | $n_5 = 1.72342$ | $\nu_5 = 37.95$ |
| $r_{10} = -92.437$ | | | |
| $\Sigma d = 61.7$ | | | |
| $f = 100$ | $f_B = 43.63$ | F 2.8 | |
| $f_{123} = 75.3$ | $f/f_{123} = 1.33$ | | |
| $f_{45} = -182$ | $f/f_{45} = -0.55$ | | |

Embodiment

| | | | |
|---|---|---|---|
| $r_1 = 30.923$ | | | |
| | $d_1 = 7.81$ | $n_1 = 1.755$ | $\nu_1 = 52.33$ |
| $r_2 = 71.738$ | | | |
| | $d_2 = 2.34$ | | |
| $r_3 = -244.898$ | | | |
| | $d_3 = 3.13$ | $n_2 = 1.7495$ | $\nu_2 = 35.27$ |
| $r_4 = 52.545$ | | | |
| | $d_4 = 5.72$ | | |
| $r_5 = 9.610$ | | | |
| | $d_5 = 11.39$ | $n_3 = 1.755$ | $\nu_3 = 52.33$ |
| $r_5' = -50.947$ | | | |
| | $d_5' = 3.75$ | $n_3' = 1.69895$ | $\nu_3' = 30.12$ |
| $r_6 = -196.964$ | | | |
| | $d_6 = 19.38$ | | |
| $r_7 = -20.926$ | | | |
| | $d_7 = 3.13$ | $n_4 = 1.69350$ | $\nu_4 = 53.23$ |
| $r_8 = -33.687$ | | | |
| | $d_8 = 0.31$ | | |
| $r_9 = -165.646$ | | | |
| | $d_9 = 4.35$ | $n_5 = 1.69895$ | $\nu_5 = 30.12$ |
| $r_{10} = 98.231$ | | | |
| $\Sigma d = 61.31$ | | | |
| $f = 100$ | $f_B = 43.31$ | F 2.8 | |
| $f_{123} = 69$ | $f/f_{123} = 1.45$ | | |

-continued

Embodiment

| | | |
|---|---|---|
| $f_{45} = -126.2$ | $f/f_{45} = -0.79$ | | wherein the reference symbols $r_1$ through $r_{10}$ represent radii of curvature of the respective lens surfaces, the symbols $d_1$ through $d_9$ represent the axial thicknesses of the respective lenses and axial air spaces between the lenses, the symbols $n_1$ through $n_5$ represent the refractive indices of the respective lenses, and the symbols $\nu_1$ through $\nu_5$ represent the Abbe's numbers of the respective lenses, respectively.

Figure 2:
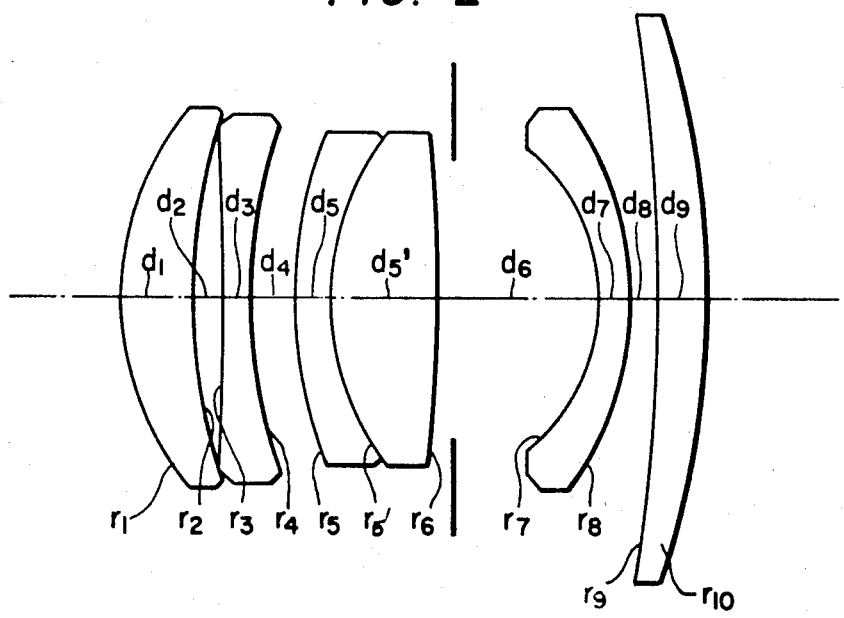
FIGS. 2 through 4 show sectional views of various embodiments of the present invention.
Figure 3:
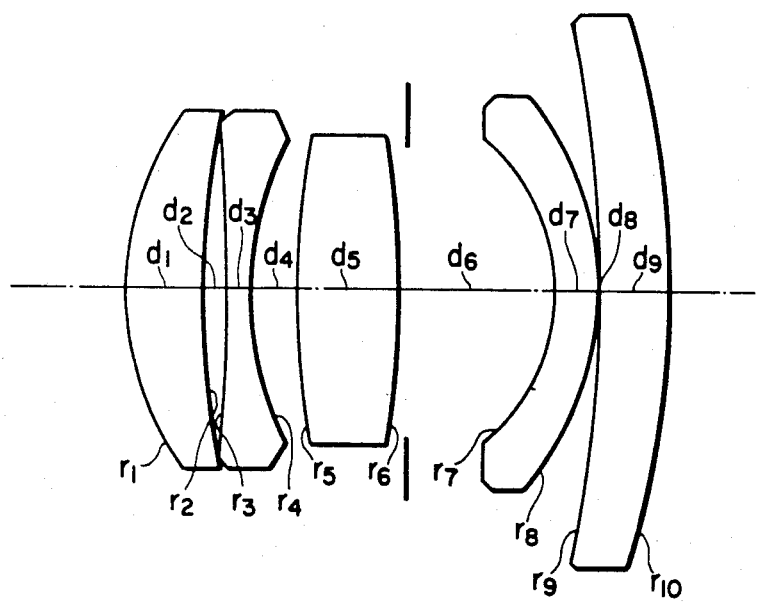
Figure 4:
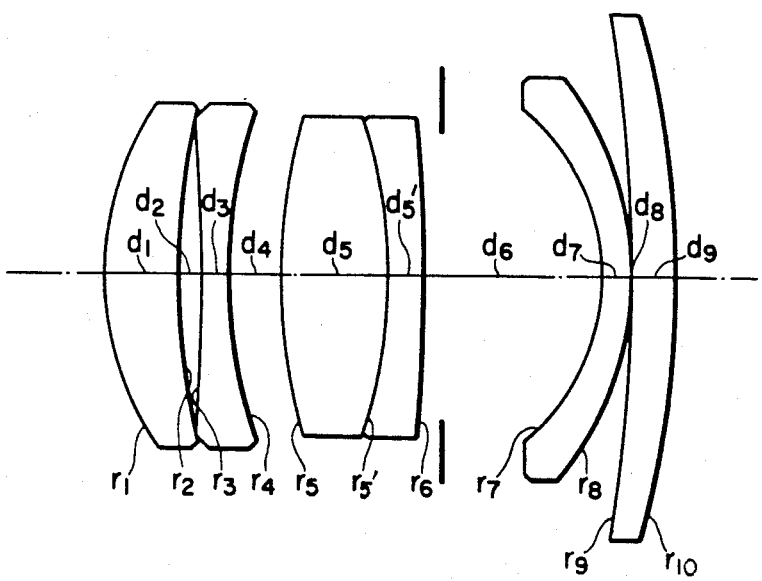
Figure 5:
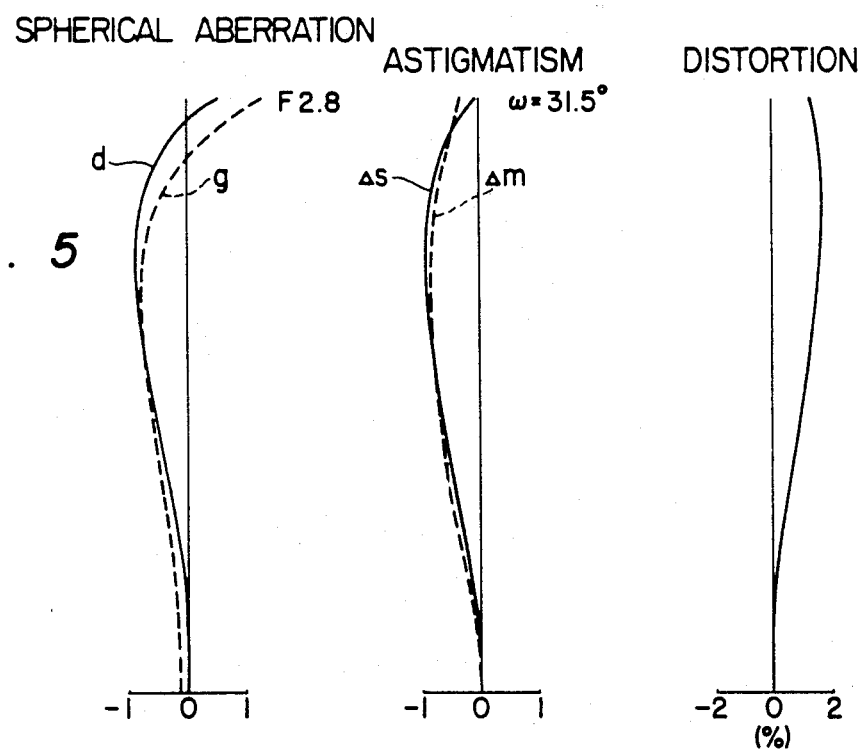
FIGS. 5 through 8 show graphs illustrating conditions of aberrations of the above-mentioned embodiments.
Figure 6:
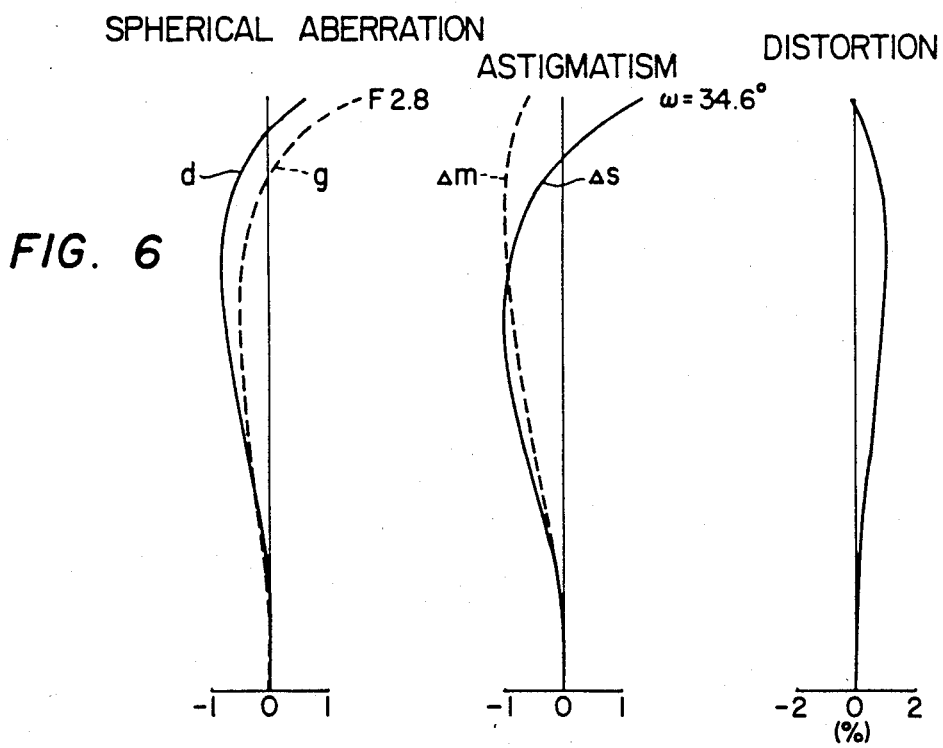
Figure 7:
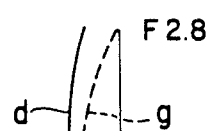
Figure 7:
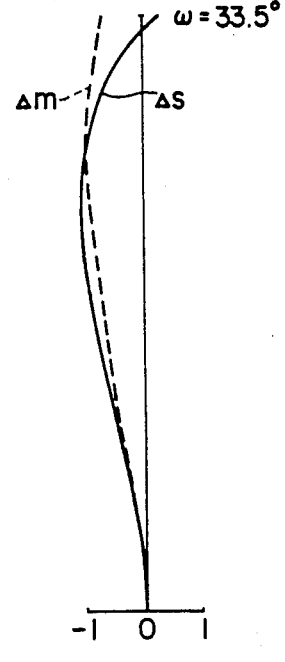
Figure 7:
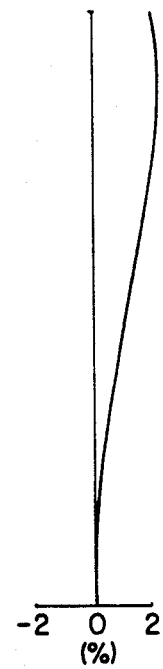
Figure 8:
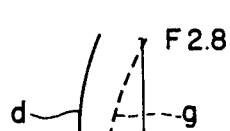
Figure 8:
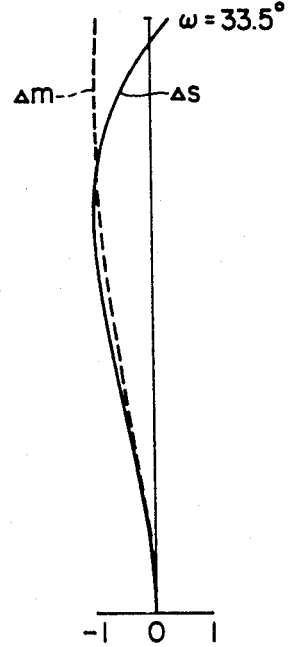
Figure 8:
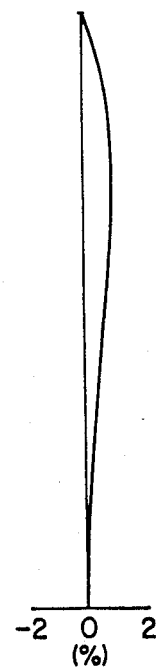

Among the above-described embodiments, in Embodiment 1, the third lens component in FIG. 2 is a cemented lens. Therefore, the symbol $D_5$ in the condition (3) represents $D_5 + D'_5$, the thickness of both the lenses, and the cementing surface is represented by $r'_5$, and the refractive indices of both the lenses are represented by $n_3$ and $n'_3$, and the Abbe's numbers of both the lenses are represented by $\nu_3$ and $\nu'_3$. The aberration curves of Embodiment 1 are shown in FIG. 5. In Embodiment 2, the third lens component in FIG. 3 is a single lens. The aberration curves of Embodiment 2 are shown in FIG. 6. Further, in Embodiments 3 and 4, the third lens component in the lens system in FIG. 4 is a cemented lens as in Embodiment 1. The aberration curves of these Embodiments are shown in FIGS. 7 and 8, respectively.

I claim:

1. A photographic lens system comprising a first lens component of a positive meniscus lens with its convex surface on the object side, a second lens component of a biconcave lens, a third lens component having a positive refracting power, a fourth lens component of a negative meniscus lens with its convex surface on the image side and a fifth lens component of a positive meniscus lens with its convex surface on the image side, the said lens system satisfying the following conditions:

(1) $1.3 < f/f_{123} < 1.7$
(2) $-1.2 < f/f_{45} < -0.4$
(3) $0.11 < D_5/f < 0.16$
(4) $0.16 < d_6/f < 0.23$ wherein the reference symbol f represents the focal length of the total lens system, the symbol $f_{123}$ represents the composite focal length of the first, second and third lens components, the symbol $f_{45}$ represents the composite focal length of the fourth and fifth lens components, the symbol $D_5$ represents the axial thickness of the third lens component and the symbol $d_6$ represents the axial air space between the third and fourth lens components, respectively.

2. A photographic lens system according to claim 1, further satisfying the following conditions:

(5) $0.18 < |r_7|/f < 0.23$
(6) $0.16 < d_6/f < 0.23$ wherein the reference symbol $r_7$ represents the radius of curvature of the lens surface on the object side of the fourth lens component, and the symbol $d_6$ represents the axial air space between the third and fourth lens components, respectively.

3. A photographic lens system according to claim 2, in which the said third lens component is a cemented positive lens, having the following data:

| | | | |
|---|---|---|---|
| $r_1 = 28.264$ | | | |
| | $d_1 = 7.35$ | $n_1 = 1.788$ | $\nu_1 = 47.43$ |

-continued

| | | | |
|---|---|---|---|
| $r_2 = 57.161$ | | | |
| | $d_2 = 3.09$ | | |
| $r_3 = -277.429$ | | | |
| | $d_3 = 2.94$ | $n_2 = 1.78472$ | $\nu_2 = 25.71$ |
| $r_4 = 54.228$ | | | |
| | $d_4 = 4.47$ | | |
| $r_5 = 45.437$ | | | |
| | $d_5 = 3.39$ | $n_3 = 1.80440$ | $\nu_3 = 39.62$ |
| $r_5' = 27.309$ | | | |
| | $d_5' = 10.80$ | $n_3' = 1.72$ | $\nu_3' = 46.03$ |
| $r_6 = -185.983$ | | | |
| | $d_6 = 16.56$ | | |
| $r_7 = -18.491$ | | | |
| | $d_7 = 2.94$ | $n_4 = 1.804$ | $\nu_4 = 46.57$ |
| $r_8 = -32.533$ | | | |
| | $d_8 = 2.98$ | | |
| $r_9 = -188.491$ | | | |
| | $d_9 = 5$ | $n_5 = 1.7495$ | $\nu_5 = 35.27$ |
| $r_{10} = -84.671$ | | | |
| $\Sigma d = 59.52$ | | | |
| $f = 100$ | $f_B = 38.85$ | F 2.8 | |
| $f_{123} = 62.1$ | $f/f_{123} = 1.61$ | | |
| $f_{45} = -90.9$ | $f/f_{45} = -1.1$ | | | wherein the reference symbols $r_1$ through $r_{10}$ represent radii of curvature of the respective lens surfaces, the symbols $d_1$ through $d_9$ represent the axial thicknesses of the respective lenses and axial air spaces between the lenses, the symbols $n_1$ through $n_5$ represent the refractive indices of the respective lenses, and the symbols $\nu_1$ through $\nu_5$ represent the Abbe's numbers of the respective lenses, respectively.

4. A photographic lens system according to claim 2, in which the said third lens component is a single positive lens, having the following data:

| | | | |
|---|---|---|---|
| $r_1 = 29.984$ | | | |
| | $d_1 = 8.62$ | $n_1 = 1.7725$ | $\nu_1 = 49.6$ |
| $r_2 = 91.570$ | | | |
| | $d_2 = 2.24$ | | |
| $r_3 = -363.920$ | | | |
| | $d_3 = 3.08$ | $n_2 = 1.69895$ | $\nu_2 = 30.12$ |
| $r_4 = 38.182$ | | | |
| | $d_4 = 4.92$ | | |
| $r_5 = 89.488$ | | | |
| | $d_5 = 11.18$ | $n_3 = 1.741$ | $\nu_3 = 52.68$ |
| $r_6 = -112.502$ | | | |
| | $d_6 = 17.21$ | | |
| $r_7 = -22.028$ | | | |
| | $d_7 = 4.98$ | $n_4 = 1.6398$ | $\nu_4 = 34.48$ |
| $r_8 = 31.264$ | | | |
| | $d_8 = 0.32$ | | |
| $r_9 = -129.517$ | | | |
| | $d_9 = 7.10$ | $n_5 = 1.7432$ | $\nu_5 = 49.41$ |
| $r_{10} = -97.491$ | | | |
| $\Sigma d = 59.65$ | | | |
| $f = 100$ | $f_B = 47.98$ | F 2.8 | |
| $f_{123} = 74.1$ | $f/f_{123} = 1.35$ | | |
| $f_{45} = -232$ | $f/f_{45} = -0.431$ | | | wherein the reference symbols $r_1$ through $r_{10}$ represent radii of curvature of the respective lens surfaces, the symbols $d_1$ through $d_9$ represent the axial thicknesses of the respective lenses and axial air spaces between the lenses, the symbols $n_1$ through $n_5$ represent the refractive indices of the respective lenses, and the symbols $\nu_1$ through $\nu_5$ represent the Abbe's numbers of the respective lenses, respectively.

5. A photographic lens system according to claim 2, in which the said third lens component is a cemented positive lens, having the following data:

| | | | |
|---|---|---|---|
| $r_1 = 32.686$ | | | |
| | $d_1 = 8.44$ | $n_1 = 1.788$ | $\nu_1 = 47.43$ |
| $r_2 = 85.756$ | | | |
| | $d_2 = 2.19$ | | |
| $r_3 = -236.675$ | | | |
| | $d_3 = 3.13$ | $n_2 = 1.71736$ | $\nu_2 = 29.51$ |
| $r_4 = 46.799$ | | | |
| | $d_4 = 5.88$ | | |
| $r_5 = 77.718$ | | | |
| | $d_5 = 7.56$ | $n_3 = 1.7859$ | $\nu_3 = 44.18$ |
| $r_5' = -56.705$ | | | |
| | $d_5' = 3.75$ | $n_3' = 1.68893$ | $\nu_3' = 31.08$ |
| $r_6 = -180.584$ | | | |
| | $d_6 = 22.91$ | | |
| $r_7 = -21.841$ | | | |
| | $d_7 = 2.28$ | $n_4 = 1.697$ | $\nu_4 = 48.51$ |
| $r_8 = -29.745$ | | | |
| | $d_8 = 0.31$ | | |
| $r_9 = -115.761$ | | | |
| | $d_9 = 5.25$ | $n_5 = 1.72342$ | $\nu_5 = 37.95$ |
| $r_{10} = -92.437$ | | | |
| $\Sigma d = 61.7$ | | | |
| $f = 100$ | $f_B = 43.63$ | F 2.8 | |
| $f_{123} = 75.3$ | $f/f_{123} = 1.33$ | | |
| $f_{45} = -182$ | $f/f_{45} = -0.55$ | | | wherein the reference symbols $r_1$ through $r_{10}$ represent radii of curvature of the respective lens surfaces, the symbols $d_1$ through $d_9$ represent the axial thicknesses of the respective lenses and axial air spaces between the lenses, the symbols $n_1$ through $n_5$ represent the refractive indices of the respective lenses, and the symbols $\nu_1$ through $\nu_5$ represent the Abbe's numbers of the respective lenses, respectively.

6. A photographic lens system according to claim 2, in which the said third lens component is a cemented positive lens, having the following data:

| | | | |
|---|---|---|---|
| $r_1 = 30.923$ | | | |
| | $d_1 = 7.81$ | $n_1 = 1.755$ | $\nu_1 = 52.33$ |
| $r_2 = 71.738$ | | | |
| | $d_2 = 2.34$ | | |
| $r_3 = -244.898$ | | | |
| | $d_3 = 3.13$ | $n_2 = 1.7495$ | $\nu_2 = 35.27$ |
| $r_4 = 52.545$ | | | |
| | $d_4 = 5.72$ | | |
| $r_5 = 59.610$ | | | |
| | $d_5 = 11.39$ | $n_3 = 1.755$ | $\nu_3 = 52.33$ |
| $r_5' = -50.947$ | | | |
| | $d_5' = 3.75$ | $n_3' = 1.69895$ | $\nu_3' = 30.12$ |
| $r_6 = -196.964$ | | | |
| | $d_6 = 19.38$ | | |
| $r_7 = -20.926$ | | | |
| | $d_7 = 3.13$ | $n_4 = 1.69350$ | $\nu_4 = 53.23$ |
| $r_8 = -33.687$ | | | |
| | $d_8 = 0.31$ | | |
| $r_9 = -165.646$ | | | |
| | $d_9 = 4.35$ | $n_5 = 1.69895$ | $\nu_5 = 30.12$ |
| $r_{10} = 98.231$ | | | |
| $\Sigma d = 61.31$ | | | |
| $f = 100$ | $f_B = 43.31$ | F 2.8 | |
| $f_{123} = 69$ | $f/f_{123} = 1.45$ | | |
| $f_{45} = -126.2$ | $f/f_{45} = -0.79$ | | | wherein the reference symbols $r_1$ through $r_{10}$ represent radii of curvature of the respective lens surfaces, the symbols $d_1$ through $d_9$ represent the axial thicknesses of the respective lenses and axial air spaces between the lenses, the symbols $n_1$ through $n_5$ represent the refractive indices of the respective lenses, and the symbols $\nu_1$ through $\nu_5$ represent the Abbe's numbers of the respective lenses, respectively.

* * * * *